J. Wilson.
Railroad Switch.
Nº 10,621. Patented Mar. 7, 1854.
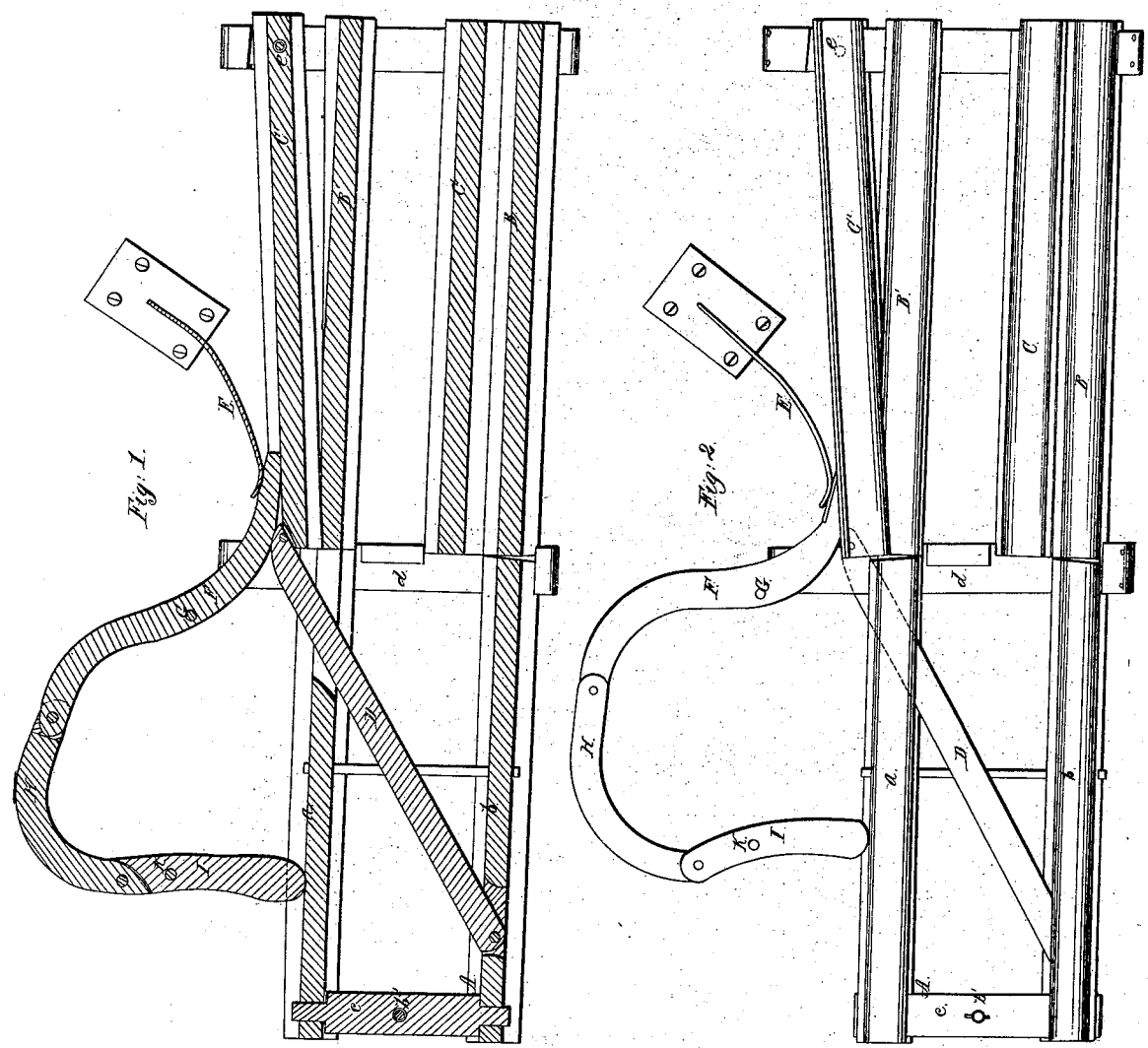

UNITED STATES PATENT OFFICE.

JOSEPH WILSON, OF HARTFORD, CONNECTICUT.

SELF-ACTING RAILROAD-SWITCH.

Specification of Letters Patent No. 10,621, dated March 7, 1854.

*To all whom it may concern:*

Be it known that I, JOSEPH WILSON, of Hartford, in the county of Hartford and State of Connecticut, have invented a new and useful Improvement in Operating Railroad-Switches, which I do hereby declare to be described and represented in the following specification and the accompanying drawings, letters, figures, and references thereof.

Of the said drawings, Figure 1 denotes a top view, and Fig. 2 a horizontal section of my invention as applied to a switch and the turn out and main tracks of a railway.

In the drawings, $a$ $b$ denote the two rails of a switch A, which is made to turn on a vertical point $b'$, that extends up through one of the transverse connection bars $c$, $d$, of the switch rails.

B and B' are the stationary bars of the turn-out track, while C and C' are the rail bars of the main track, they being arranged with respect to each other as seen in the drawings. The bar C is made stationary, while the bar C' is made movable horizontally on a pivot $e$ placed at or near that end of it which is farthest from the switch. This bar C' is jointed at its front end to one end of a proportional connecting bar D, which extends diagonally across the switch and has its other end jointed to a switch bar $b$ (or to some other part of the switch) at such a distance from the pivot $b'$ as will cause the switch under the movement of the bar C', induced by the pressure of the flanges of the wheels, as will be hereinafter described, to move from engagement with the turnout rails into engagement with the main track rails. The switch end of the rail C' is placed at a distance from the rail B' greater than the thickness of the flanges of the carriage wheels, the front or other end of the bar C' being caused to rest against the rail B' and to be forced up to it by the pressure of a spring E, that forces the tail end of a bent lever F against the bar C'. The lever F turns on a fulcrum G and is jointed at its front end to one end of a curved connecting bar H, whose other end is jointed to one arm of a locking lever I, this latter to turn horizontally on a fulcrum K and to have its other arm standing at right angles with the switch when the latter is in line with the turnout. By such a position of such last mentioned arm of the lever I the switch will be locked in engagement with the turnout while a train or carriage is running on it and the turnout. When a train or carriage is moving on the main track bars C, C' toward the switch, the pressure of the flanges of the wheels against the two rails will move the movable rail C' into parallelism with the rod C, and at the same time not only cause the locking lever to be turned far enough to permit the switch to be moved, but cause by means of the bar D such a movement of the switch as will carry such switch into line with the main tracks before the wheels reach the switch. As soon as the wheels have left the main track and passed on to the switch, the reaction of the spring E not only moves the switch back up to the turnout, but the locking lever up to the switch. Thus the switch, by a very simple arrangement is operated by the switch wheels of the cars.

I am aware that a switch has been operaed by the cars, but I believe this has never been effected by an arrangement or mechanism so simple and effective as that herein described.

I do not claim the connection of a switch and a bar C' by a jointed lever, so that the motion of one gives a corresponding motion to the other; nor do I claim to operate the switch by means of a bar forming part of one of the main track rails; nor do I claim to return the switch to its position by means of a spring and catch after it has been displaced by the pressure of the flange of the car wheel, but I limit my claim to the precise arrangement of the parts for operating the switch by means of the lateral pressure of the wheel flanges on the inner sides of the movable and fixed rail, while the cars are on the rails.

In testimony whereof, I have hereto set my signature this sixth day of September, A. D. 1853.

JOSEPH WILSON.

Witnesses:
MERRITT BRONSON,
GEO. S. GILMAN.